F. W. BARHOFF.
METHOD OF AND MEANS FOR SEALING TERMINAL POSTS IN STORAGE BATTERY COVERS.
APPLICATION FILED APR. 7, 1919.

1,328,359.

Patented Jan. 20, 1920.

Inventor:
Fred W. Barhoff
by Harry R. Williams
atty.

UNITED STATES PATENT OFFICE.

FRED W. BARHOFF, OF HARTFORD, CONNECTICUT, ASSIGNOR TO THE HARTFORD STORAGE BATTERY MANUFACTURING COMPANY, OF HARTFORD, CONNECTICUT, A CORPORATION OF CONNECTICUT.

METHOD OF AND MEANS FOR SEALING TERMINAL POSTS IN STORAGE-BATTERY COVERS.

1,328,359. Specification of Letters Patent. Patented Jan. 20, 1920.

Application filed April 7, 1919. Serial No. 288,098.

*To all whom it may concern:*

Be it known that I, FRED W. BARHOFF, a citizen of the United States, residing at Hartford, in the county of Hartford and State of Connecticut, have invented a new and useful Improvement in Methods of and Means for Sealing Terminal Posts in Storage-Battery Covers, of which the following is a specification.

This invention relates to the means employed for sealing the openings in storage battery cell covers about the terminal posts to which the plates are attached and that extend upwardly through the covers.

The tight seal of these openings is at all times difficult, and no sealing compound has been produced which will adhere to the metal of which the posts are formed in the presence of the acid of the electrolyte used in storage batteries, and, furthermore, electrolytic acid will work out around the threads if such sealing is attempted by screwing one part upon another.

The object of this invention is to provide a method of and means for sealing the posts into covers which is simple, cheap, strong, and tight, and which readily permits the quick disassembling of the parts for cleaning or repairs without injury or destruction to any part of the posts, connectors, cover or cell.

This object is attained by providing each post with an integral collar, over which a packing gasket is placed, and upon which the cover rests when in place in the top of the cell and contracting into a wedging groove in the post above the cover a compressible metallic ring which forces the cover down upon the packing gasket and insures a tight joint, such metallic ring being readily expanded and removed when it is desired to free the cover.

Figure 1:
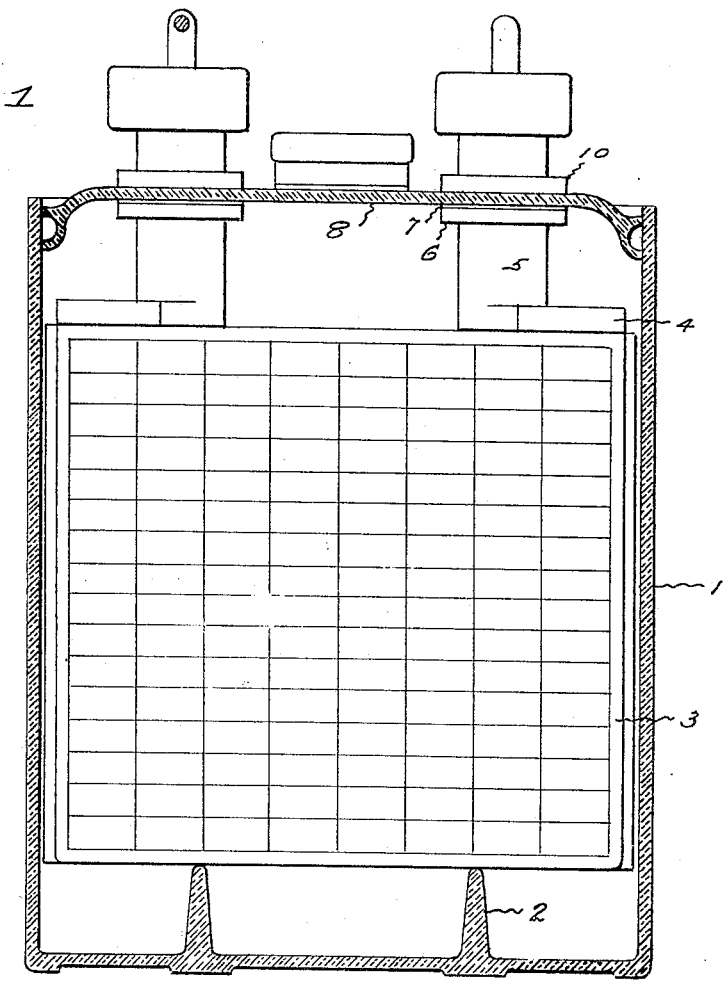
Figure 2:
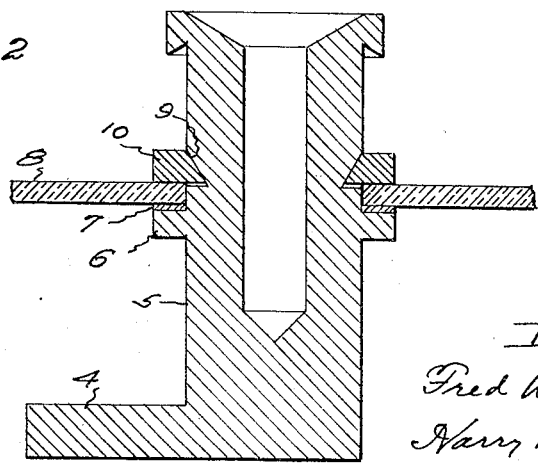

In the accompanying drawings Figure 1 shows a side elevation of a storage battery with the jar and cover cut in vertical section and illustrating the terminal posts sealed in the cover according to this invention. Fig. 2 shows on larger scale a central section of a post and the means for sealing it in the opening in the cover.

The battery jar 1 which is illustrated is made of rubber in the usual manner with bridging ribs 2 at the bottom supporting the elements 3 which comprise the common positive and negative plates and separators. The respective positive and negative plates are lead-burned in the ordinary way to the straps 4 which are formed integral with the posts 5 that commonly are made of lead alloy. The collar 6 is formed integral with the post just below the cover and upon this collar is placed a packing gasket 7 of rubber or similar compressible material. The cell cover 8 when in place rests upon the gasket. In the post at about the level of the upper surface of the cover a wedge shaped groove 9 is formed. The bottom of the groove is usually made slightly below the top of the cover. When the cover is in position on the top of the cell and is resting upon the packing gasket on the collar, formed on the post which projects through the opening in the cover, a ring 10 of lead or other suitable material is compressed into the groove. As the ring is forced into the groove the engagement of the inclined faces of the ring and groove presses the cover tightly down upon the gasket and completes a tight sealing of the joints. When it is desired to remove the cover for cleaning or repairing the battery, it is only necessary to expand the compression rings and free them from the wedge shaped grooves and then the cover can be easily lifted off. This construction firmly secures the cover and obviates the employment of the molten sealing compounds which are frequently used but are not thoroughly reliable and which require the application of heat in order to soften them for removal, and eliminates all threads which are liable to become damaged and which provide passages for the escape of the electrolytic acid.

The invention claimed is:—

1. The method of sealing terminal posts in the covers of storage battery cells which consists in contracting metallic rings into openings in the posts above the covers and simultaneously forcing the covers down upon parts of the posts below the covers.

2. The combination with the cover of a storage battery cell of terminal posts having integral shoulders below the cover and grooves above the cover, and constriction rings adapted to be contracted into said grooves for forcing the cover down upon the shoulders and expanded from said grooves for releasing the cover.

3. A means for sealing terminal posts in storage battery covers which comprises a post with an integral shoulder and a wedge shaped groove above the shoulder, and a compressible ring adapted to be contracted into and expanded from said groove.

4. Means for sealing terminal posts in storage battery covers which comprises a post with a shoulder and a wedge-shaped groove above the shoulder, and a split ring of pliable metal adapted to be compressed into and expanded from said groove.

FRED W. BARHOFF.